United States Patent [19]

Larson

[11] 3,801,335

[45] Apr. 2, 1974

[54] PATTERN WAX COMPOSITION

[75] Inventor: Allen E. Larson, Chicago, Ill.

[73] Assignee: Atlantic Richfield Company, New York, N.Y.

[22] Filed: Nov. 16, 1970

[21] Appl. No.: 90,126

[52] U.S. Cl............ 106/38.8, 106/272, 260/28.5 A
[51] Int. Cl......................... B28b 7/34, C08h 17/14
[58] Field of Search .......... 106/270, 272, 38.8, 271; 260/28.5 R

[56] References Cited
UNITED STATES PATENTS

| | | | |
|---|---|---|---|
| 2,722,557 | 11/1955 | Danison | 260/652.5 |
| 2,962,464 | 11/1960 | Feild | 106/270 |
| 3,263,286 | 8/1966 | Watts | 106/38.8 |
| 2,795,505 | 6/1957 | Finck | 106/38.8 |

OTHER PUBLICATIONS

A. H. Warth, "Chemistry & Technology of Waxes," Reinhold Pub. Co, New York, 1956, p. 538, 548

*Primary Examiner*—Morris Liebman
*Assistant Examiner*—P. R. Michl
*Attorney, Agent, or Firm*—Thomas J. Clough

[57] ABSTRACT

Novel pattern wax composition for use in investment casting by the Lost Wax Process are disclosed. The pattern materials consist essentially of waxes such as petroleum waxes, natural vegetable or mineral waxes, synthetic waxes and various resinous materials derived from the refining of petroleum and wood rosin, and mixtures of the above. The base wax generally has a melting point of between about 120 to 180°F. The base wax composition is improved by the inclusion of up to about 75 percent by weight, preferably up to about 50 percent by weight of solid filler particles of pentaerythritol or oligomer thereof. Pentaerythritol is the preferred filler.

16 Claims, No Drawings

PATTERN WAX COMPOSITION

This invention relates to pattern wax compositions having a base wax and solid filler which have low-shrinkage upon cooling from the temperature of injection to ambient temperature during the making of wax patterns for the Lost Wax Process of investment casting. More specifically, this invention relates to improvements in low-shrinkage, low spalling tendency pattern wax composition and advantages accruing to the Lost Wax Process through the use of such novel pattern wax composition.

Investment casting by the Lost Wax Process involves the making of a destructible wax pattern, commonly by injection molding the pattern in a master mold. The patterns then are dipped into a slurry of a suitable finely-divided refractory mold material which sets up to form a solid shell around the wax pattern. Generally, the pattern is dipped into an aqueous slurry of finely-divided (e.g., less than 325 mesh) silica flour, for instance, or a mixture of finely-divided silica and zircon and then dried. This dipping is repeated until a fine surface is established. The silica-coated pattern is then dipped into an aqueous slurry of a larger particle size inorganic material, e.g., metal oxides such as alumina, of a particle size of about +100 mesh or larger to build up the refractory mold thickness. This dipping into the larger particle size slurry is repeated until the desired thickness is attained. The dipping slurry can be acidic or basic, for example, with a pH of up to about 9 being preferred. The pattern is subsequently removed from within the refractory mold, usually by heating and melting out the wax and burning any residue remaining inside the mold. Molten metal, such as an alloy, can then be poured into the refractory mold, thereby casting the desired metal shapes. Further details of the above process are well known to those skilled in the art.

One of the important requirements of pattern wax materials for high precision applications is that they exhibit low-shrinkage as the patterns cool from the respective injection temperatures, at which the waxes are liquid or semi-solid, to the ambient temperature at which the patterns are usually employed to make the refractory molds. Due to the low-shrinkage characteristics, the dimensions of the refractory molds more closely correspond to those of the final metal castings. In this respect, it is common practice to use finely-divided solid filler materials as components of the pattern wax materials in order to reduce the shrinkage of the resultant wax patterns. The filler particles are uniformly distributed throughout the wax, both in the wax-melted state before injection, and in the solid state after injection molding the patterns. However, problems encountered through the use of various filler materials give rise to the need for improved pattern wax compositions.

A particular problem associated with the use of high pH slurries is the possible interaction of components in the pattern wax composition with such slurry. The interaction of a filler material with the slurry which forms the refractory mold can cause spalling on the inside surface of the refractory mold which thereafter will cause imperfections on the metal casting. Thus, it is highly desirable to utilize a filler material which can be used in contact with slurries which have a varying pH, especially when such pH is greater than 9.

An additional problem associated with the use of pattern wax compositions is contact with water during handling and processing, e.g., rinsing the patterns in an aqueous solution to dissipate static change prior to dipping into the slurry. Thus, the solid filler material should be substantially insoluble in water to avoid leaching out the filler material.

Further properties which are highly desirable in a filler material are the ability to be removed from refractory molds during dewaxing or burn out without leaving residues in the refractory molds and the ability to be subjected to prolonged preinjection conditioning at elevated temperatures prior to actual use without having such filler material form an agglomerate or gel in the pre-injection conditioning equipment. The incomplete removal of the pattern wax compositions and formation of a residue during removal can result in imperfections in the metal casting.

Nitrogen-containing fillers such as the ethylene stearamide, ethylene dilauramide, etc., described in U.S. Pat. No. 3,316,105 are somewhat compatible with the base wax compositions at the initial mixing and pre-injection conditioning temperatures of the filled wax compositions. Because of this compatibility during mixing, or while being maintained at the temperature required to keep the wax fluid or semi-solid prior to injection into the master molds, the filler partially dissolves in the base wax, thus diminishing its desired function of decreasing shrinkage and making it difficult or impossible to keep the wax consistent in composition and properties.

Various attempts have been made to improve the characteristics of pattern waxes. Inorganic fillers such as powdered mica or silica have been employed but these materials are often left in the mold in small amounts subsequent to melting out of the wax pattern material. Some fillers are usually available as irregularly shaped particles, such as wood fiber, sugar or silica, but these are disadvantageous since they can inhibit the flow of the pattern wax into the master mold or out of the refractory molds. Polystyrene beads have also been used for some time as a filler but this material has disadvantages. For instance, during removal from the refractory mold, the pattern wax base can melt first and run out of the mold leaving a polystyrene residue. If heating rates are not properly controlled, the polystyrene will char, making it difficult to remove from the mold. Moreover, even if the polystyrene is melted properly, its viscosity or tacky consistency often causes it to pull away some of the refractory composition from the wall of the mold, thus introducing imperfections on the surface of the metal casting.

An object of this invention is to provide improved pattern wax compositions which have low-shrinkage upon cooling from the molten or semi-solid state at the injection temperature to the solid state at ambient temperature, and a reduced tendency to agglomerate during long hold times at pre-injection temperatures.

A further object of this invention is to provide improved pattern wax compositions which will result in a reduced incidence of spalling on the inside surfaces of the refractory molds.

It has now been found that pattern wax compositions having low-shrinkage characteristics and result in a reduced incidence of spalling in the refractory molds are obtained by pattern wax compositions consisting essentially of about 25 to 95 parts by weight of a base wax and about 5 to 75 parts by weight of a filler material selected from the group consisting of pentaerythritol, di-pentaerythritol, tri-pentaerythritol and mixtures thereof. The parts by weight as set forth above refer to parts by weight of the total pattern wax composition. The finely-divided filler material often has particle sizes up to 600 microns, preferably up to about 250 microns, in their maximum dimension. Particle sizes in the preferred range generally have smooth surfaces and desirable flow characteristics. Generally, the smaller the particles, the less likely they are to settle out at elevated temperatures at which the filler is in the solid state and the other components of the compositions are liquid. Pentaerythritol is the preferred filler material. The pattern wax compositions preferably contain a major amount of the base wax and a minor amount, e.g. less than 50 parts by weight, of the filler. Suitable base wax compositions can include petroleum waxes, natural vegetable or mineral waxes, synthetic waxes and various thermoplastic resinous materials derived, for example, from tall oil, gum and wood rosin, terpene-type resins or mixtures of these materials and synthetic polymers and copolymers, such as polyethylene or ethylene vinyl acetate and mixtures and combinations of the above. The base wax compositions usually melt at temperatures in the range of about 120° to about 180°F. Suitable base wax blends include petroleum waxes including paraffin waxes which have a melting point from about 135°F. to about 160°F. and microcrystalline waxes having a melting point from about 130°F. to about 180°F. These waxes may be fully refined and thus contain very small amounts of hydrocarbon oils. Suitable base wax blends in general comprise from about 5 to 40 parts by weight paraffin wax, from about 5 to about 40 parts by weight microcrystalline wax, from about 5 to about 40 parts by weight of a vegetable wax and from about 1 to about 50 parts by weight of one or more resinous components having a softening point in general within the range of from about 125° to about 350°F. The preferred vegetable wax is carnauba. Various resinous components are, for example, synthetic polymers, e.g. polyethylene, vinyl toluene α-methyl styrene interpolymer resin, terpene resins and dimerized resin acid from wood rosin. In general, the preferred composition contains either a vinyl toluene α-methyl styrene interpolymer resin, a dimerized resin acid from wood rosin, a terpene resin or a mixture thereof in the amounts as set forth above. The invention can be better appreciated by the following non-limiting examples.

EXAMPLE I

A suitable base wax composition contains 24 parts by weight of a paraffin wax, having an ASTM D-87 melting point of about 133°F., 8 parts by weight microcrystalline wax having an ASTM D-127 melting point of about 170°F., 8 parts by weight carnauba wax such as Pure Refined No. 3 N.C. Carnauba, 20 parts by weight dimerized resin acid from wood rosin having a softening point of about 290°F. and 20 parts by weight of a vinyl toluene, α-methyl styrene interpolymer resin having a softening point of about 150°F. A filled pattern composition was made using 80 parts by weight of this base wax and 20 parts by weight pentaerythritol which had been passed through a U.S. Standard 200 mesh screen. The resulting composition was characterized as follows:

| | |
|---|---|
| Congealing Point (ASTM D-938), °F. | 137.0 |
| Brookfield Viscosity, cp. at 180°F. | 168 |
| 170°F. | 212 |
| 160°F. | 278 |
| 150°F. | 404 |
| 145°F. | 612 |
| % Ash Residue (1800°F. Combustion Temperature) | 0.0085 |

Patterns were made with the above pattern material composition on a Leyden, one-pound shot wax injection machine with a non-agitated reservoir at a 160°F. injection temperature at a one-minute injection cycle with 200 psig. injection pressure. Completely acceptable patterns were made with excellent surface detail reproduction and smoothness, and no flow lines were observed in the patterns under these conditions.

The dimensional stability and strength of the patterns of Example I were tested by deflecting specimens with 0.5 inch by 0.150 inch cross section between 2 inch centers and measuring the amount of force required to break and the deflection of the specimen at the break point for various temperatures.

The following results were obtained:

TABLE I

| Temperature, °F. | 77 | 86 |
|---|---|---|
| Modulus of Rupture, psi. | 1064 | 1262 |
| Deflection, inches | 0.06 | 0.17 |

The results in Table I demonstrate the extremely high dimensional stability and strength of the pattern wax compositions.

EXAMPLE II

The pattern wax compositions of Example I were subjected to a complete investment casting process including injection molding of the pattern wax composition, the assembly into clusters, dip coating, dewaxing and the resulting formation of a metal casting. The metal castings were observed to have substantially no defects resulting from spalling inside the refractory molds.

EXAMPLE III

A base wax composition was prepared using the following components on a parts by weight basis:

| Component | Parts by Weight |
|---|---|
| Paraffin Wax, 143°F. melting point | 10 |
| Paraffin Wax, 153°F. melting point | 10 |
| Microcrystalline Wax, 140°F. melting point | 10 |
| Microcrystalline Wax, 170°F. melting point | 10 |
| Carnauba Wax | 10 |
| Synthetic Terpene Resin | 25 |
| Dimerized Resin Acid from Wood Rosin, 290°F. Softening Point | 25 |

A pattern wax composition using 80 parts by weight of the above base wax and 20 parts by weight pentaerythritol was tested for coefficient of cubical expansion (ASTM D-1168) over a temperature range of 80°F. to 160°F. The coefficient expansion of the base wax was 0.00072 and for the filled pattern wax composition, 0.00044.

The results set forth in Examples I to III demonstrate the outstanding performance of the pattern wax compositions when used in the Lost Wax Process. More particularly, the pattern wax compositions of this invention have relatively low ash residues thereby substantially eliminating imperfections on the metal casting. Of additional importance is the fact that the compositions of this invention have a relatively low coefficient of expansion as a function of temperature especially when compared to a base wax composition not having incorporated therein the pentaerythritol fillers. An additional outstanding property of the compositions of this invention is the substantial elimination of spalling on the refractory mold material due the lack of interaction of the filler material with refractory mold material. Thus, the metal castings produced by the Lost Wax Process do not have imperfections due to spalling of the refractory mold.

In addition, the compositions of this invention have outstanding properties and are particularly adaptable to an improved process for forming a mold of desired shape in which a pattern material is shaped in a mold of the desired shape by a process in which a molded pattern material is coated with a slurry of finely-divided refractory material, the coating is dried, the coatings and drying being repeated to build up a total refractory coating of a desired thickness and the pattern material removed by melting from within the coating to form a refractory mold.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A composition consisting essentially of from about 25 to about 95 parts by weight of said composition of a base wax comprising a petroleum wax and about 5 to about 75 parts by weight of said composition of a filler selected from the group consisting of pentaerythritol, dipentaerythritol, tri-pentaerythritol and mixtures thereof.

2. A composition of claim 1 wherein the filler is pentaerythritol.

3. A composition of claim 2 wherein the filler has a particle size up to about 600 microns.

4. A composition consisting essentially of from about 25 to about 95 parts by weight of said composition of a base wax wherein said base wax comprises from about 5 to about 40 parts by weight paraffin wax, from about 5 to about 40 parts by weight of a microcrystalline wax and from about 5 to about 40 parts by weight of a vegetable wax, and about 5 to about 75 parts by weight of said composition of a filler selected from the group consisting of pentaerythritol, di-pentaerythritol, tri-pentaerythritol, and mixtures thereof.

5. A composition of claim 4 wherein the base wax contains an additional component of from 1 to about 50 parts by weight each of one or more resinous components having a softening point within the range of from about 125° to about 350°F.

6. A composition of claim 5 wherein the resinous component material is selected from the group consisting of a vinyl toluene α-methyl styrene interpolymer resin, a terpene resin, a dimerized resin acid from wood rosin and mixtures thereof.

7. A composition of claim 6 wherein the resinous component is a mixture of vinyl toluene α-methyl styrene interpolymer resin and dimerized resin acid from wood rosin.

8. A composition of claim 6 wherein the resinous component is a mixture of dimerized resin acid from wood rosin and a terpene resin.

9. In a process for forming a mold of desired shape in which a pattern material is shaped in a mold of the desired shape, the molded pattern material is coated with a slurry of finely-divided refractory material, the coating is dried, the coatings and drying being repeated to build up a total refractory coating of a desired thickness and the pattern material removed by melting from within the coating to form a refractory mold, the improvement which comprises using as said pattern material a composition of claim 1.

10. A process of claim 9 wherein the composition of claim 1 consists essentially of from about 25 to about 95 parts by weight of said composition of a base wax and about 5 to about 75 parts by weight of said composition of pentaerythritol.

11. A process of claim 10 wherein the pentaerythritol filler has a particle size up to about 600 microns.

12. In a process for forming a mold of desired shape in which a pattern material is shaped in a mold of the desired shape, the molded pattern material is coated with a slurry of finely-divided refractory material, the coating is dried, the coatings and drying being repeated to build up a total refractory coating of a desired thickness and the pattern material removed by melting from within the coating to form a refractory mold, the improvement which comprises using as said pattern material a composition of claim 5.

13. A process of claim 12 wherein the base wax contains an additional component of from 1 to about 50 parts by weight each of one or more resinous components having a softening point within the range of from about 125° to about 350°F.

14. A process of claim 13 wherein the resinous component material is selected from the group consisting of a vinyl toluene α-methyl styrene interpolymer resin, a terpene resin, a dimerized resin acid from wood rosin and mixtures thereof.

15. A process of claim 14 wherein the resinous component is a mixture of vinyl toluene α-methyl styrene interpolymer resin and dimerized resin acid from wood rosin.

16. A process of claim 14 wherein the resinous component is a mixture of dimerized resin acid from wood rosin and a terpene resin.

* * * * *

PO-1050
(5/69)

UNITED STATES PATENT OFFICE
CERTIFICATE OF CORRECTION

Patent No. 3,801,335            Dated April 2, 1974

Inventor(s) Allen E. Larson

It is certified that error appears in the above-identified patent and that said Letters Patent are hereby corrected as shown below:

Column 6, line 42: delete the number "5" and substitute therefore ---4---.

Signed and sealed this 13th day of August 1974.

(SEAL)
Attest:

McCOY M. GIBSON, JR.          C. MARSHALL DANN
Attesting Officer            Commissioner of Patents